US010525637B2

(12) United States Patent
Ogale et al.

(10) Patent No.: US 10,525,637 B2
(45) Date of Patent: Jan. 7, 2020

(54) FLAT COMPOSITES HAVING LAYUP FEATURES FOR FORMING INTO 3D SHAPES

(71) Applicant: The Boeing Company, Chicago, IL (US)

(72) Inventors: Amol Ogale, Munich (DE); Phillip J. Crothers, Melbourne (AU)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 15/454,875

(22) Filed: Mar. 9, 2017

(65) Prior Publication Data
US 2018/0257315 A1   Sep. 13, 2018

(51) Int. Cl.
| | | |
|---|---|---|
| *B32B 41/00* | (2006.01) | |
| *B29C 70/38* | (2006.01) | |
| *B29C 70/54* | (2006.01) | |
| *G05B 19/4097* | (2006.01) | |
| *B29K 307/04* | (2006.01) | |
| *B29K 105/08* | (2006.01) | |

(52) U.S. Cl.
CPC .......... *B29C 70/382* (2013.01); *B29C 70/386* (2013.01); *B29C 70/54* (2013.01); *G05B 19/4097* (2013.01); *B29K 2105/0872* (2013.01); *B29K 2307/04* (2013.01); *G05B 2219/35134* (2013.01)

(58) Field of Classification Search
CPC ..... B29C 70/382; B29C 70/54; B29C 70/386; G05B 19/4097; G05B 2219/35134; B29K 2105/0872; B29K 2307/04
USPC .................. 156/64, 350, 351, 378, 379, 425
See application file for complete search history.

(56) References Cited

U.S. PATENT DOCUMENTS

| | | |
|---|---|---|
| 2007/0144676 A1 | 6/2007 | Tang et al. |
| 2009/0199948 A1 | 8/2009 | Kisch |
| 2016/0059513 A1 | 3/2016 | Hollander |

OTHER PUBLICATIONS

Tanninen et al. Controlling the Folding of the Blank in Paperboard Tray Press Forming. Bioresources. 10. 5191-5202. 10.15376/biores. 10.3.5191-5202. https://www.researchgate.net/publication/281063086_Controlling_the_Folding_of_the_Blank_in_Paperboard_Tray_Press_Forming (Year: 2015).*

(Continued)

*Primary Examiner* — Michael N Orlando
*Assistant Examiner* — Joshel Rivera
(74) *Attorney, Agent, or Firm* — Duft & Bornsen, PC (57) ABSTRACT

Systems and methods are provided for designing flat composites that are formed into 3D shapes. One embodiment is a method that includes loading data defining a three dimensional (3D) shape for a composite part, identifying constraints based on dimensions of the 3D shape, simulating flattening of the 3D shape into a planar shape, and acquiring a mandrel having the planar shape. The method also includes placing features at the mandrel which permit a laminate laid-up onto the mandrel to compensate for the constraints during forming of the laminate into the 3D shape, and generating a Numerical Control (NC) program that directs an Automated Fiber Placement (AFP) machine laying up the laminate. The NC program includes instructions for laying up tows of constituent material onto the mandrel having the features, to form layers of the laminate.

28 Claims, 10 Drawing Sheets

(56) References Cited

OTHER PUBLICATIONS

Composite Applications-CGTech; http://www.cgtech.com/Products (http://www.cgtech.com/products/).
Dimos Siagoulis; Using Solidworks and ExactFlat to Design, Optimize, and Flatten Composite Products; Jun. 3, 2016.
Integrated Design and Analysis of Composite Structures using FiberSIM and ANSYS ACP; VISTAGY engineer success; ANSYS, Inc. 2011;.
Jozef Novak et al; Visualization of Manufacturing Composite Lay-up Technology by Augmented Reality Application; Tecknical University of Kosice, Slovakia.
Mike McLeod; Design Engineering; Canadian-made ExactFlat CAD removes guesswork from 3D textile design; Oct. 23, 2014.
Software Update: Simulation saves: Composites World Newsletter; Sep. 2014.
Vericut Composite Simulation⇒CGTech; http://www.cgtech.com/products/composite-applications.
Visualization of composite lay-up technology with use of augmented reality elements; http://ieeexplore.ieee.org/abstract/document/6208953; Dec. 17, 2016.
European Search Report; EP18152012; dated Aug. 3, 2018.

\* cited by examiner

FLAT COMPOSITES HAVING LAYUP FEATURES FOR FORMING INTO 3D SHAPES

FIELD

The disclosure relates to the field of composite materials, and in particular to layup performed by an Automated Fiber Placement (AFP) machine (also known as an Automated Tape Laying (ATL) machine).

BACKGROUND

Composite parts, such as those made from Carbon Fiber Reinforced Polymer (CFRP), combine high levels of mechanical strength with low weight. This combination is desirable in the field of aircraft design and manufacture. The manufacture of a composite part involves laying up constituent material in layers to form a laminate. The constituent material may comprise a tape that includes parallel carbon fibers pre-impregnated with curable resin. Such pre-impregnated tape is also referred to as "pre-preg" tape. AFP machines may be utilized in order to predictably and reliably lay up pre-preg tape in an automated fashion based on a Numerical Control (NC) program. The resulting laminate is then cured in order to harden into a composite part.

Many desired shapes for composite parts are complex and three dimensional (3D). While AFP machines are capable of laying up complex 3D shapes, the speed of operation of an AFP machine, especially when laying up sharp corners, is substantially reduced. Hence, the amount of machine time (and therefore expense) involved in laying up complex 3D laminates is substantially higher than for flat laminates (e.g., laminates which are largely planar in shape, and which have a height less than a tenth that of their width and/or length). Furthermore, it may be particularly difficult to maintain a laminate in a 3D shape before the laminate has been cured.

Designers of composite parts may utilize AFP machines to lay up flat laminates for curing into flat composite parts, but flat laminates fail to capture any complex surface geometries desired for a composite part (e.g., ensuring an aerodynamic shape). Furthermore, it is not feasible to form flat laminates into complex 3D shapes. This is because carbon fiber within a flat laminate is highly resistant to stretching. Hence, wrinkles may form in the resulting shape as the flat laminate is formed (e.g., molded).

Thus, designers of composite parts continue to seek out techniques for forming a complex contoured part out of flat material without generating wrinkles.

SUMMARY

Embodiments described herein generate designs for flat laminates that include features enabling the flat laminates to be formed (e.g., stamped/pressed/molded) into complex 3D shapes without creasing, wrinkling, warping, or tearing. These "2.5D" laminates include layup features (e.g., excess material) in predefined locations. These features enable their corresponding locations to be formed according to a desired 3D shape without losing structural integrity. In further embodiments, an AFP machine laying up such laminates may detect discrepancies in tow placement during physical layup, and alter an NC program directing layup in order to ensure that new layers of tape are placed over the gaps.

One embodiment is a method that includes loading data defining a three dimensional (3D) shape for a composite part, identifying constraints based on dimensions of the 3D shape, simulating flattening of the 3D shape into a planar shape, and acquiring a mandrel having the planar shape. The method also includes placing features at the mandrel which permit a laminate laid-up onto the mandrel to compensate for the constraints during forming of the laminate into the 3D shape, and generating a Numerical Control (NC) program that directs an Automated Fiber Placement (AFP) machine laying up the laminate. The NC program includes instructions for laying up tows of constituent material onto the mandrel having the features, to form layers of the laminate.

A further embodiment is a non-transitory computer readable medium embodying programmed instructions which, when executed by a processor, are operable for performing a method. The method includes placing features at a planar mandrel which permit a laminate laid-up onto the mandrel to compensate for constraints corresponding with a three dimensional (3D) shape during forming of the laminate into the 3D shape, and generating a Numerical Control (NC) program that directs an Automated Fiber Placement (AFP) machine laying up the laminate. The NC program includes instructions for laying up tows of constituent material onto the planar mandrel, including the features placed at the mandrel, to form layers of the laminate. The method also includes laying up the laminate according to the NC program, and forming the laminate into the 3D shape.

A further embodiment is a system that includes a memory that stores data defining a three dimensional (3D) shape for a composite part. The system further includes a controller that loads the data, identifies constraints based on dimensions of the 3D shape, flattens the 3D shape into a planar shape, and places features at the planar shape which permit a laid-up laminate to compensate for the constraints during forming of the laminate into the 3D shape. The controller also generates a Numerical Control (NC) program that directs an Automated Fiber Placement (AFP) machine laying up the laminate, the NC program including instructions for laying up tows of constituent material to form layers of the laminate.

A still further embodiment is a method that includes forming a composite part by: laying up a two dimensional (2D) laminate onto a mandrel that has features which cause plies to be laid down such that expected shearing between the plies is already built into the 2D laminate, and forming the 2D laminate into a complex contour preform, including performing the expected shearing between the plies.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
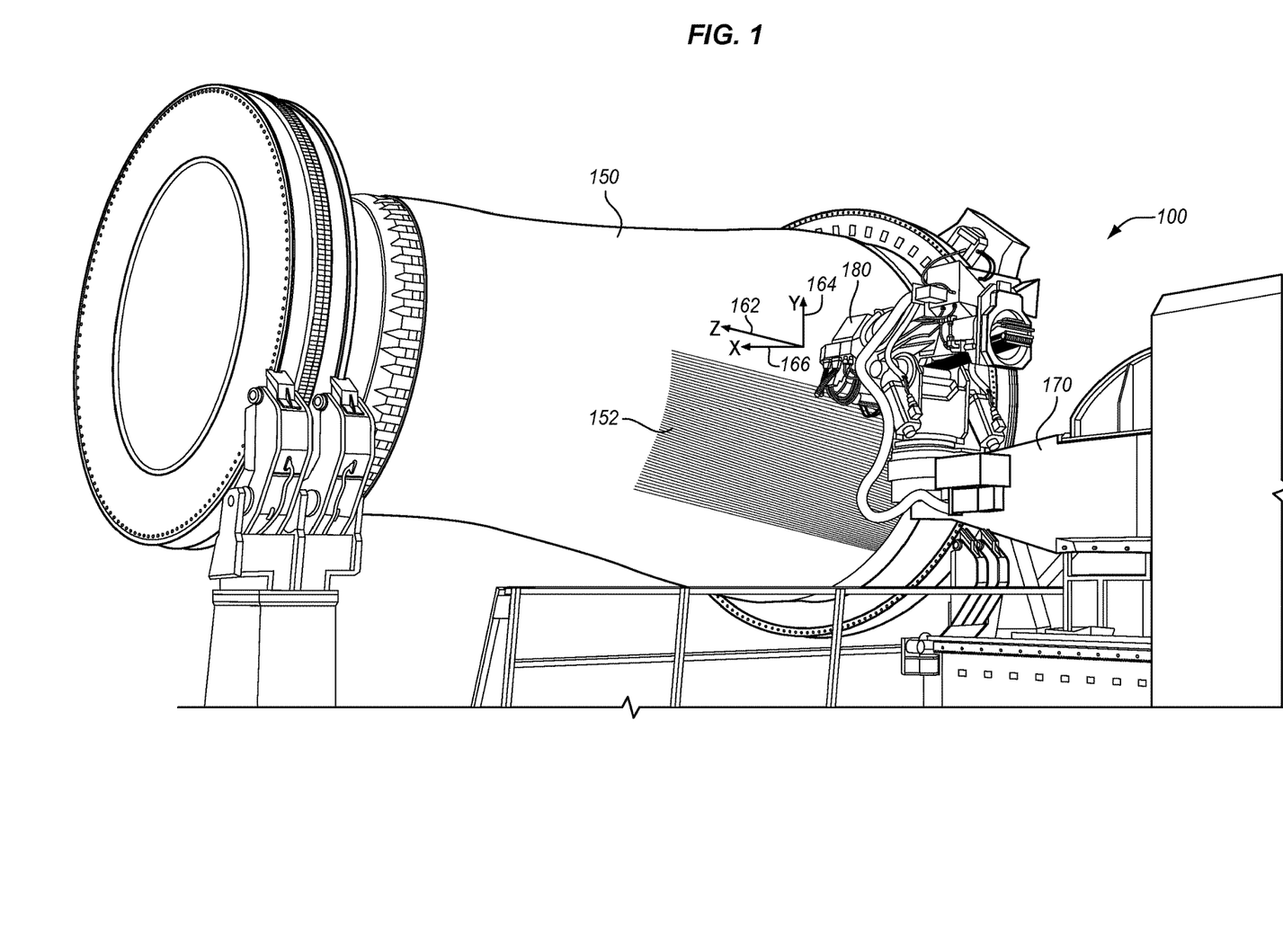
FIG. 1 is a diagram of an AFP machine in an exemplary embodiment.

FIG. 1 is a diagram illustrating an AFP machine 100 that is mounted to a support 170 in an exemplary embodiment. AFP machine 100 comprises any system or device capable of laying up tows 152 of constituent material to form a laminate 150 for curing into a composite part. AFP machine 100 includes end effector/head 180, which dispenses tows 152 of curable constituent material (e.g., pre-preg carbon fiber tape for a CFRP part) during layup. Tows 152 are laid-up to form laminate 150, which comprises one or more layers of material that will be cured into a single monolithic composite part.

As AFP machine 100 operates to lay up tows 152 onto laminate 150, AFP machine 100 may move directly towards/away from laminate 150 along axis X 166, vertically upwards/downwards along axis Y 164, and/or laterally along axis Z 162. As used herein, when AFP machine 100 lays up multiple tows 152 concurrently during a single "sweep" of head 180, those tows 152 are collectively referred to as a single "course." A set of non-overlapping courses that are applied consecutively may be referred to as a layer. As layers are added to laminate 150, the strength of the resulting composite part is beneficially enhanced.

In order to ensure that tows 152 are laid-up quickly and efficiently, the operations of AFP machine 100 are controlled by an NC program. In one embodiment, the NC program provides instructions on a course-by-course basis for aligning/repositioning AFP machine 100, moving head 180, and laying up tows 152 onto laminate 150. In this manner, by performing the instructions from the NC program, AFP machine 100 fabricates a laminate for curing into a composite part.

While AFP machine 100 is illustrated as laying up a complex curved shape in a 3D space, such a process is not always optimally efficient. Moving an AFP machine 100 across a curved surface may involve constant repositioning and realignment of a head of AFP machine 100, which slows down AFP machine 100. For these reasons, AFP machine 100 has been enhanced to cooperate with a layup design system that enables laminates to be laid-up as flat shapes (increasing layup speed) which include layup features that facilitate shaping (e.g., stamping) into desired 3D shapes. As used herein, a shape, mandrel, or laminate is considered "flat" if its height is less than ten percent (e.g., less than two percent) the amount of its width and/or length. A shape is considered a 3D shape if it is not a flat shape.

Figure 2:
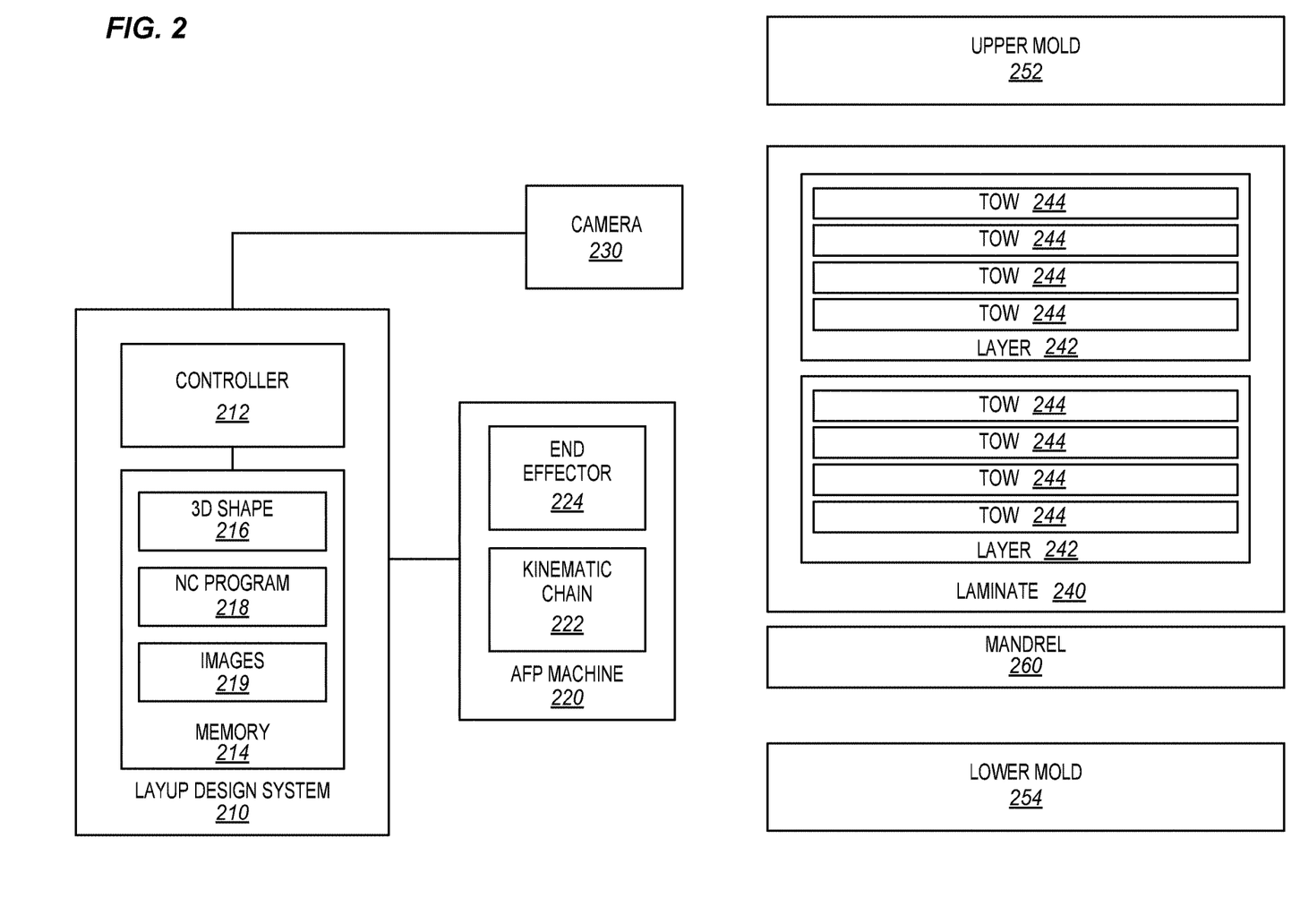
FIG. 2 is a block diagram illustrating a layup design system interacting with an AFP machine laying up a flat laminate in an exemplary embodiment.

FIG. 2 is a block diagram illustrating a layup design system 210 interacting with an AFP machine 220 laying up a flat laminate 240 in an exemplary embodiment. In this embodiment, layup design system 210 includes controller 212, which generates NC program 218 defining operations for laying up flat laminate 240. Controller 212 includes layup features in NC program 218 which ensure that laminate 240 is capable of being formed (e.g., molded/stamped) from its current shape into a desired 3D shape. Controller 212 may be implemented, for example, as custom circuitry, as a hardware processor executing programmed instructions, or some combination thereof. Layup design system 210 further includes memory 214, which stores data defining a desired 3D shape 216 for a composite part, as well as at least one NC program 218 generated by controller 212. Memory 214 may comprise any suitable computer-readable medium for storing data.

AFP machine 220 lays up tows 244 of constituent material (e.g., Carbon Fiber Reinforced Polymer (CFRP)) onto mandrel 260 based on instructions from NC program 218. In this embodiment, AFP machine 220 comprises kinematic chain 222 of actuators and rigid bodies, which operate to position end effector 224 as end effector 224 lays up tows 244 to form layers 242 of laminate 240. Camera 230 is also illustrated, which may comprise a 3D, stereoscopic, or depth camera. Camera 230 may be mounted to AFP machine 220 or independently controlled. Based on images 219 acquired from camera 230 during layup, controller 212 may adjust instructions held in NC program 218. Upon completion of layup, laminate 240 is removed from mandrel 260 and formed, for example, by stamping laminate 240 between upper mold 252 and lower mold 254.

Figure 3A:
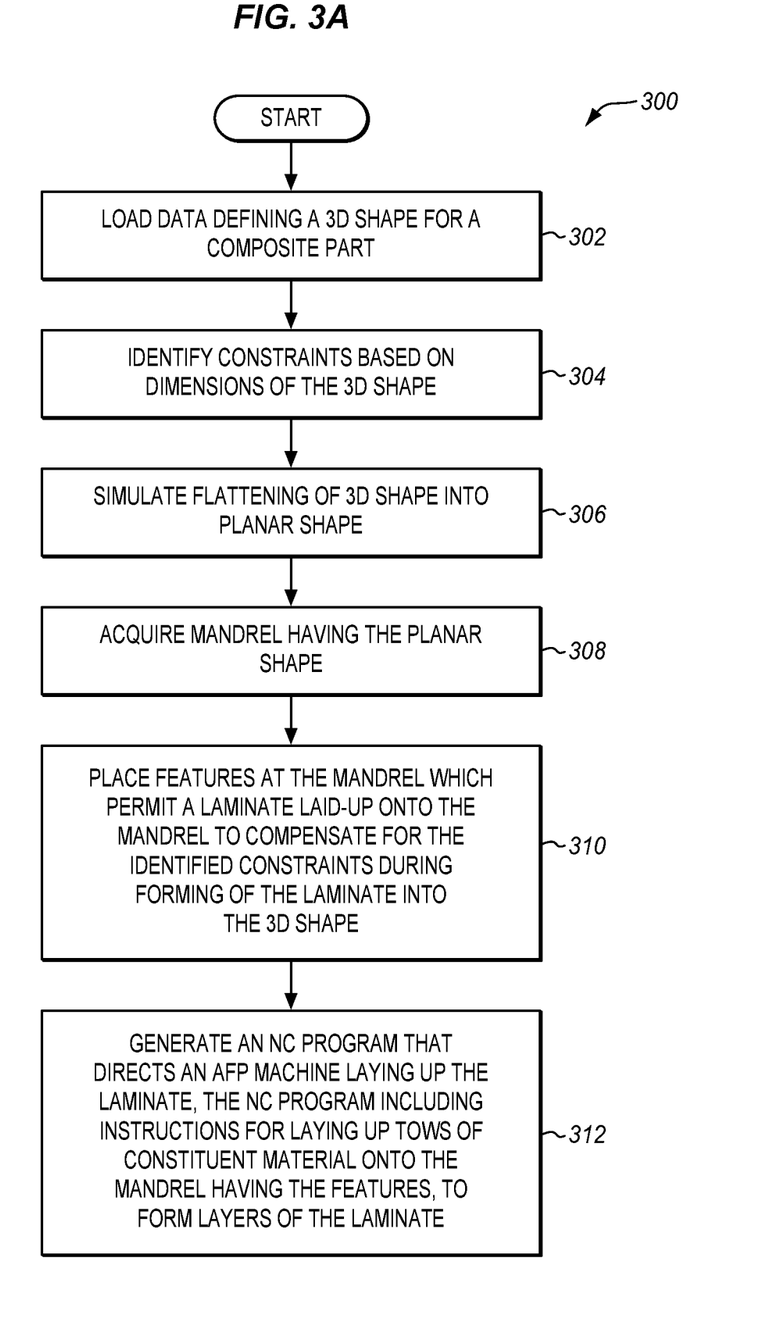
FIGS. 3A-3B are flowcharts illustrating a method for generating a layup for a laminate which will be formed into a 3D shape in an exemplary embodiment.

Illustrative details of the operation of layup design system 210 will be discussed with regard to FIGS. 3A-3B. Assume, for this embodiment, that a designer has provided input to layup design system 210 indicating a desired 3D shape of a composite part. FIG. 3A is a flowchart illustrating a method 300 for generating a layup for a laminate which will be formed into a 3D shape in an exemplary embodiment. The steps of method 300 are described with reference to layup design system 210 of FIG. 2, but those skilled in the art will appreciate that method 300 may be performed in other systems. The steps of the flowcharts described herein are not all inclusive and may include other steps not shown. The steps described herein may also be performed in an alternative order.

For method 300, controller 212 loads data defining a 3D shape for a composite part (step 302). This data may for example indicate dimensions and positions of various features of a 3D shape/structure, in a Computer Aided Design (CAD) file or 3D model file. Controller 212 further identifies constraints based on the dimensions of the 3D shape (step 304). Constraints comprise, for example, radii of various portions (e.g., corners) of the 3D shape, distances between locations on the 3D shape, etc. Controller 212 simulates flattening of the 3D shape into a planar shape (e.g., for layup as a laminate or for use as a flat mandrel) (step 306). This flattening simulation, or "roll out," anticipates how material within the 3D shape would spread outward into a flat pattern comprising multiple planar layers, and may involve placing cuts in the material to enable the material to spread.

During roll out, segmented 2D shapes may be extracted from the 3D shape and used to generate cutter files. These cutter files indicate one or more flat 2D shapes for cutting from a roll of material. For example, the cutter files may provide instructions for cutting "pre-preg" patches of laminate which are capable of being draped together to form a 3D shape. However, a designer may find multi-piece laminates to be undesirable in comparison to monolithic laminates.

With constraints identified and a rollout of the 3D shape into a planar shape successfully performed, controller 212 considers layup features to be added to the planar shape, based on the constraints.

The layup features are physical alterations to the planar shape which ensure that wrinkles are not formed during forming of the planar shape into the 3D shape. That is, the layup features ensure that wrinkles are not formed when a laminate is formed into a complex 3D contour. In one embodiment, features are placed at a mandrel 260 which permit a laminate laid-up onto mandrel 260 to compensate for the constraints during forming of the laminate into the 3D shape. In further embodiments, controller 212 may unite individual patches/pieces of the rolled out laminate in order to enhance strength while still ensuring that the resulting laminate is capable of being formed into a desired shape. That is, controller 212 ensures that segmented 2D shapes found in the cutter files are re-joined using CAD software into a large planar shape representing a laminate that will be laid up according to a desired series of operations by AFP machine 220.

In this manner, instead of designing a 2D shape and then attempting to transform it into a complex 3D contour, controller 212 starts with a complex contoured 3D CAD structure, flattens it out in a digital space, and determines a layup for a 2D laminate. The laminate will be used to create a 3D structure without wrinkles (a "2.5D" layup). This reverse engineering approach therefore utilizes transformations from 3D to 2D, and back to 3D throughout the design process.

During creation of a layup for the laminate, the planar shape is converted into a "2.5D" geometry. This process involves an understanding of the constraints of the 3D geometry to be manufactured. That is, features are added to the planar shape at expected locations of wrinkles or splits of unidirectional tapes/tows during forming, in order to add or remove material from the resulting laminate. This initial 2.5D geometry undergoes a 3D forming simulation that accounts for placement and orientation of fibers in the laminate. During the 3D forming simulation, the resulting laminate is analyzed for potential wrinkles and forming difficulties caused by ply slippage/shear (e.g., locations of substantial stress and strain, locations where excess material exists after forming, etc.). Controller 212 then adjusts the 2.5D geometry based on this information, and iteratively repeats the process of engaging in 3D forming simulations and updating the 2.5D geometry. That is, controller 212 iteratively simulates placement of the features at the mandrel, generates a simulation forming a laminate laid up onto the mandrel into the 3D shape, and alters the features based on expected wrinkles or tears indicated by the simulation.

An update to the 2.5D geometry may comprise adjusting a length of material laid-up in a given location, adjusting fiber orientations for one or more layers of the laminate, adding surface features to a mandrel, etc. In one embodiment, controller 212 adds the layup features by predicting an amount of distance that the laminate will expand during forming, and adding tow length to the laminate corresponding with the amount. For example, these predictions may account for expected shearing of plies (e.g., ply slippage) along one or multiple dimensions at each of multiple areas of interest on the planar shape. Several iterations of this simulation, followed by tuning of the 2.5D geometry, facilitate identification of critical locations in the geometry at which to avoid wrinkles.

With knowledge of the desired features stored in memory, controller 212 proceeds to acquire a mandrel having the planar shape (step 308). Controller 212 next places features at the mandrel which permit a laminate laid-up onto the mandrel to compensate for the identified constraints during forming of the laminate into the 3D shape (step 310). This may comprise, for example, physically machining or otherwise altering the mandrel.

Controller 212 further generates NC program 218, (step 312) which directs AFP machine 220 in laying up the laminate onto a flat mandrel. NC program 218 includes instructions for laying up tows of constituent material to form layers of the laminate onto a planar mandrel, including features (e.g., compensation features at the mandrel or the laminate, depending on the embodiment). This means that instead of NC program 218 causing the laminate to be laid-up onto a 3D mandrel that already exhibits a complex contour, NC program 218 provides instructions for laying up the laminate onto a flat mandrel. The mandrel and/or the layup include features which do not substantially change the overall flat shape of the mandrel. For example, the added features may have sufficiently small height (e.g., less than ten percent that of width or length) that the mandrel and laminate remain flat. In this manner, the 2.5D geometry may then be converted into a layup pattern for an AFP machine, or may be utilized to modify a mandrel to include surface features which ensure that wrinkles are not created during forming.

Figure 3B:
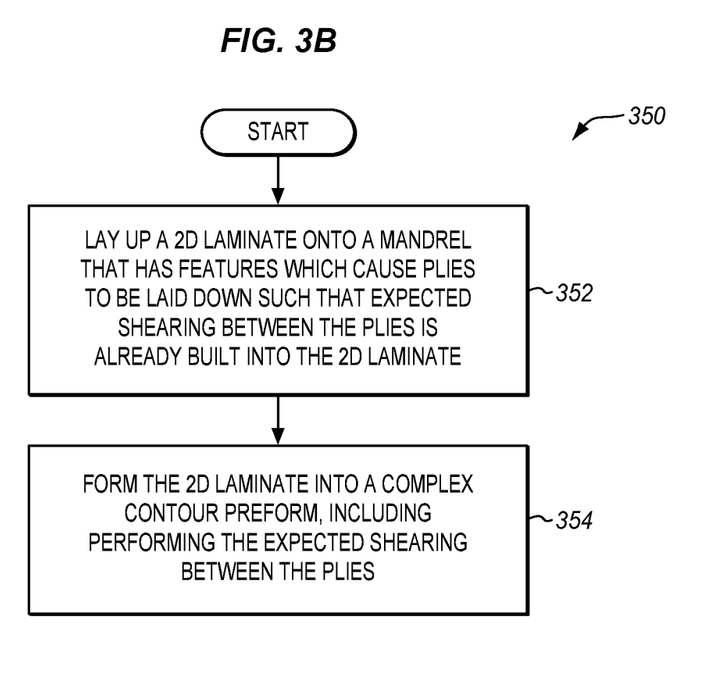

FIG. 3B illustrates a further method 350 relating to the creation of 2.5D laminates. According to FIG. 3B, controller 212 directs AFP machine 220 to lay up a 2D laminate onto a mandrel that has features which cause plies to be laid down such that expected shearing between the plies (e.g., during forming) is already built into the 2D laminate (step 352). This may be performed in accordance with NC program 218. Next, the 2D laminate is formed (e.g., stamped) into a complex contour preform (step 354). This operation performs the expected shearing between the plies as the laminate achieves the desired 3D shape. In short, the planar mandrel has features which provide material used for ply slippage/shear. Thus, when the 2.5D lay-up is formed into the 3-D shape, the material needed to accomplish desired ply slippage is available.

Figure 4:
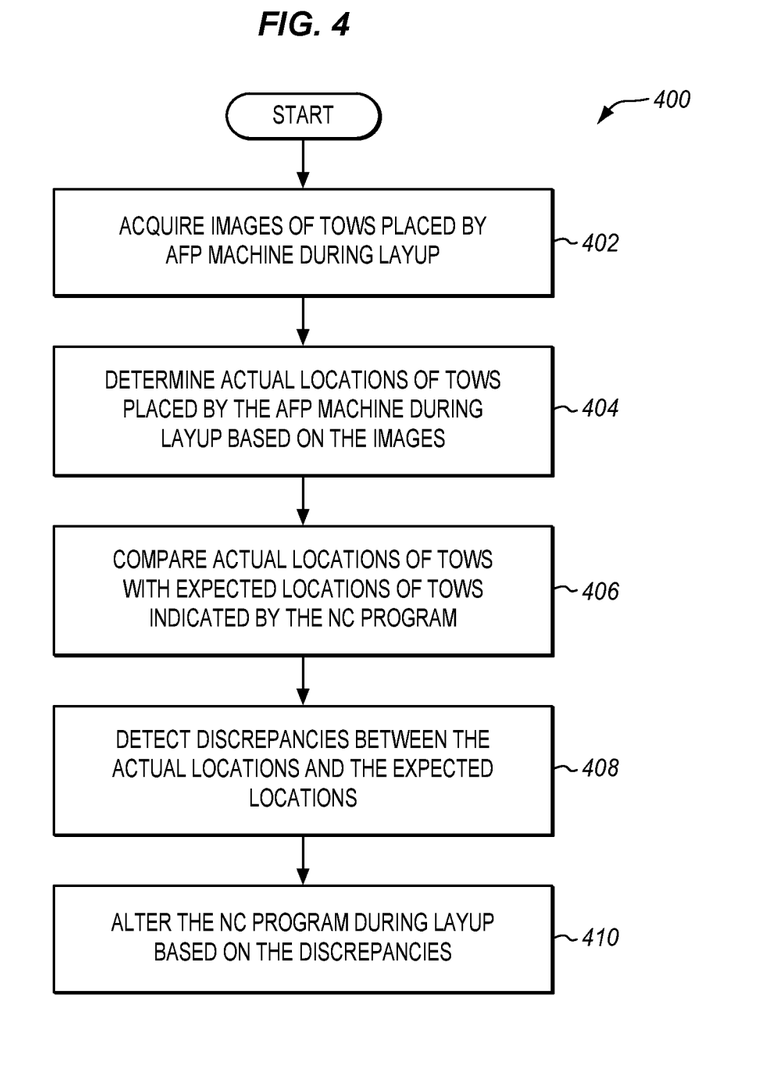
FIG. 4 is a flowchart illustrating a method for on-the-fly revisions to an NC program directing an AFP machine in an exemplary embodiment.

During layup, it remains possible that certain tows 244 will not be placed in their desired locations, owing to translation inconsistencies at AFP machine 220, unexpected variations in material, etc. For this reason, FIG. 4 provides a method 400 for updating and revising NC program 218 on-the-fly to ensure that discrepancies in physical layup are addressed quickly and effectively.

Method 400 includes controller 212 acquiring images (via camera 230) of tows 244 placed by AFP machine 220 during layup (step 402). Controller 212 further determines actual locations of tows 244 placed by AFP machine 220 during layup based on the acquired images (step 404). Controller 212 proceeds to compare actual locations of tows 244 with expected locations of tows 244 indicated by NC program 218 (step 406). Controller 212 detects discrepancies between the actual locations and the expected locations (step 408), and alters NC program 218 during layup based on these discrepancies (step 410). For example, controller 212 may identify a tow depicted by an image, correlate the tow with a tow identified in NC program 218, determining the actual location of the tow in a coordinate space used by NC program 218, and determine whether a discrepancy exists. If the discrepancy comprises a gap between tows, controller 212 may alter the NC program to cover the gap by adding instructions to place tows over the gap. If the discrepancy comprises a tow having an actual location that is offset from an expected location, controller 212 may alter the NC program by revising instructions for placing tows in other layers based on the offset.

Methods 300 and 400, when used in combination, enable a flat laminate to be shaped into a desired 3D shape, without unduly warping, tearing, or damaging carbon fibers inside of the laminate. Furthermore, these methods enable a designer to ensure that a laminate is laid-up in the manner intended, by engaging in closed-loop control of the operations of an AFP machine during layup.

EXAMPLES

In the following examples, additional processes, systems, and methods are described in the context of laminates that include layup features which allow the laminates to be formed into 3D parts without being damaged or warped.

Figure 5:
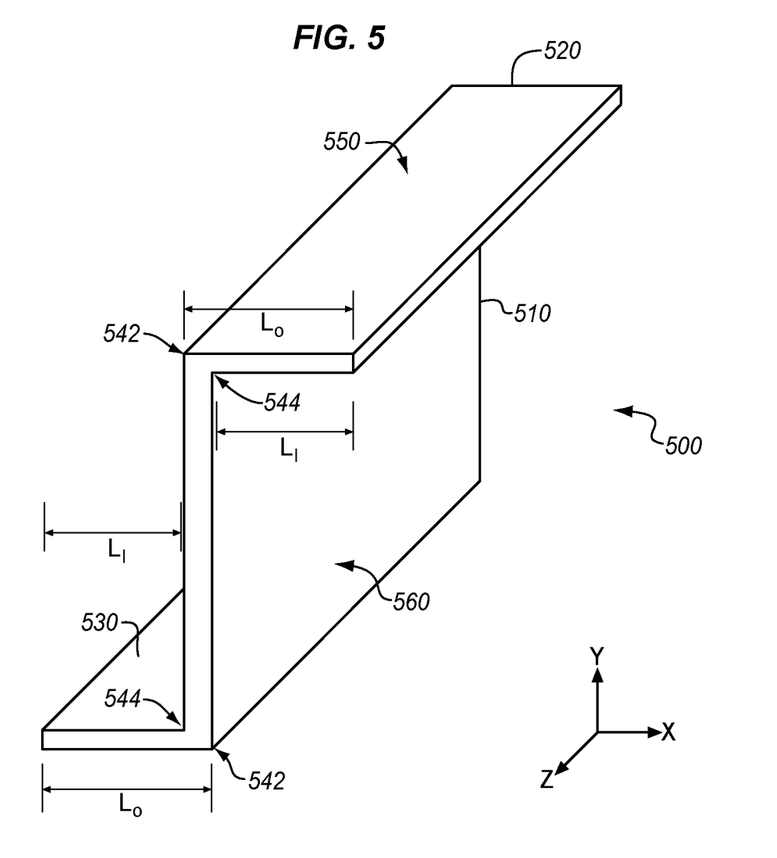
FIG. 5 is a diagram illustrating a composite part in an exemplary embodiment.
Figure 6:
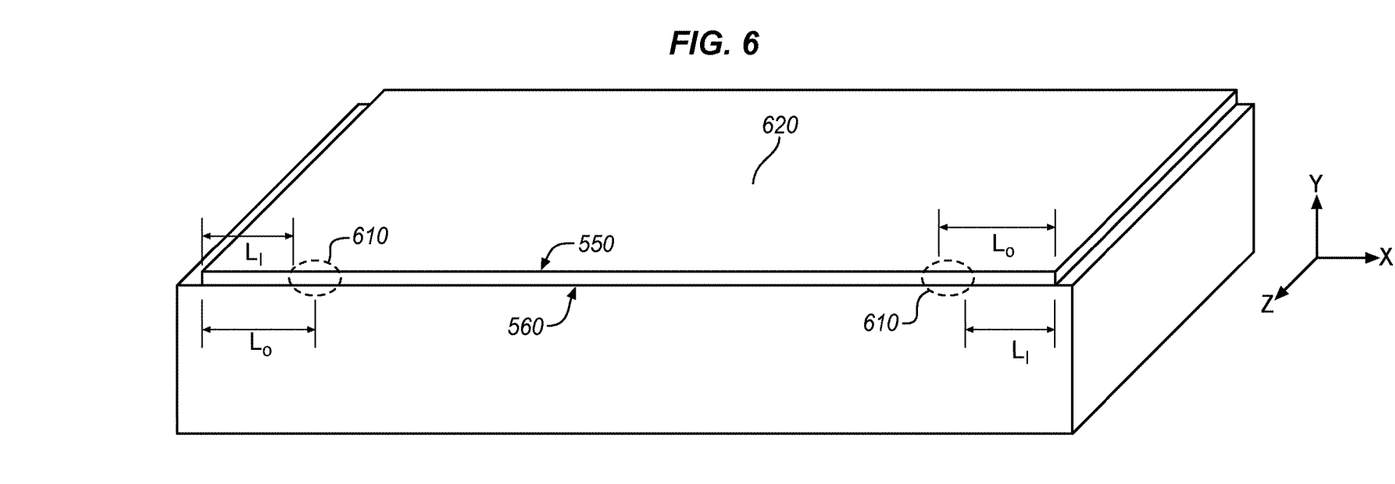
FIG. 6 is a diagram illustrating a first layup for the composite part of FIG. 5 in an exemplary embodiment.
Figure 7:
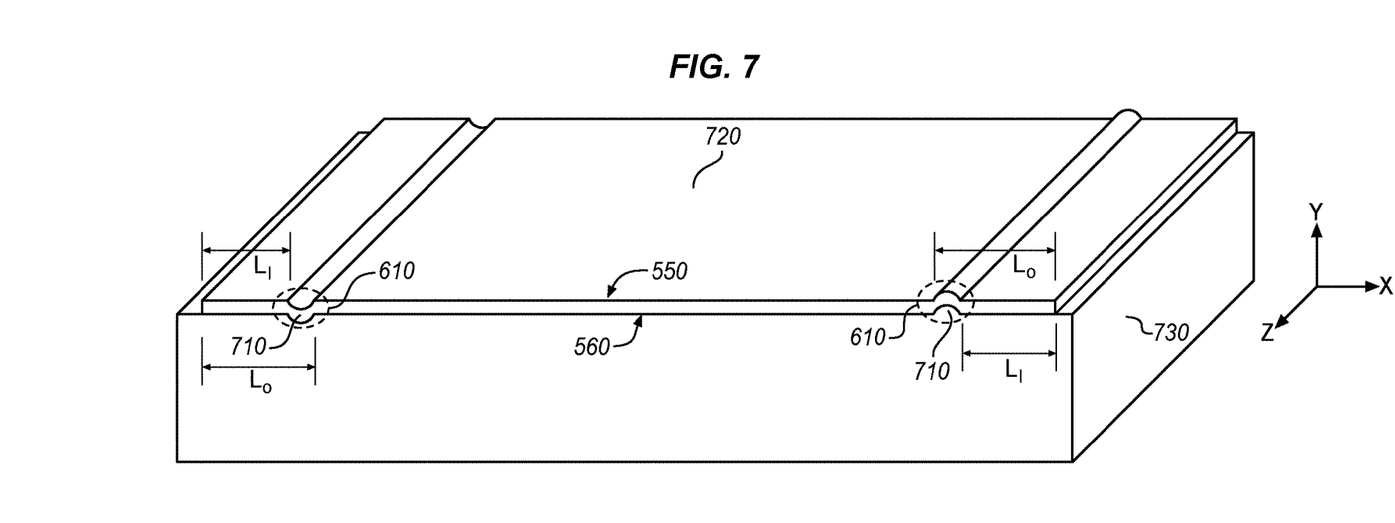
FIG. 7 is a diagram illustrating an additional layup for the composite part of FIG. 5 in an exemplary embodiment.

FIG. 5 is a diagram illustrating a composite part 500 in an exemplary embodiment. Composite part 500 includes body 510, upper flange 520, and lower flange 530. Each flange includes an exterior corner 542 as well as an interior corner 544, and these corners kink upper surface 550 and lower surface 560. As shown in FIG. 5 a distance ($L_O$) from an edge of a flange to an exterior corner is greater than a ($L_I$) distance from an edge of the flange to an interior corner. This means that a purely flat laminate having a planar shape 620 comprising a large 2D contour as shown in FIG. 6 would encounter warping in regions 610 if stamped and then cured to form composite part 500. To address this issue, as shown in FIG. 7, controller 212 of FIG. 2 has added layup features to laminate 720 in the form of layup features 710 (e.g., bumps) which are placed at mandrel 730, which result in a 2.5D geometry. These features alter the amount of material laid up in regions 610, which ensures that enough material is present to account for the interior and exterior corners of composite part 500. These layup features 710 may be integrated into mandrel 730 while the majority of mandrel 730 remains flat, may be applied in a removable manner onto mandrel 730 via rapid fabrication techniques, etc. In this manner, plies are laid-up with expected shearing between the plies (i.e., ply slippage) already built into the shape of the laminate.

Figure 8:
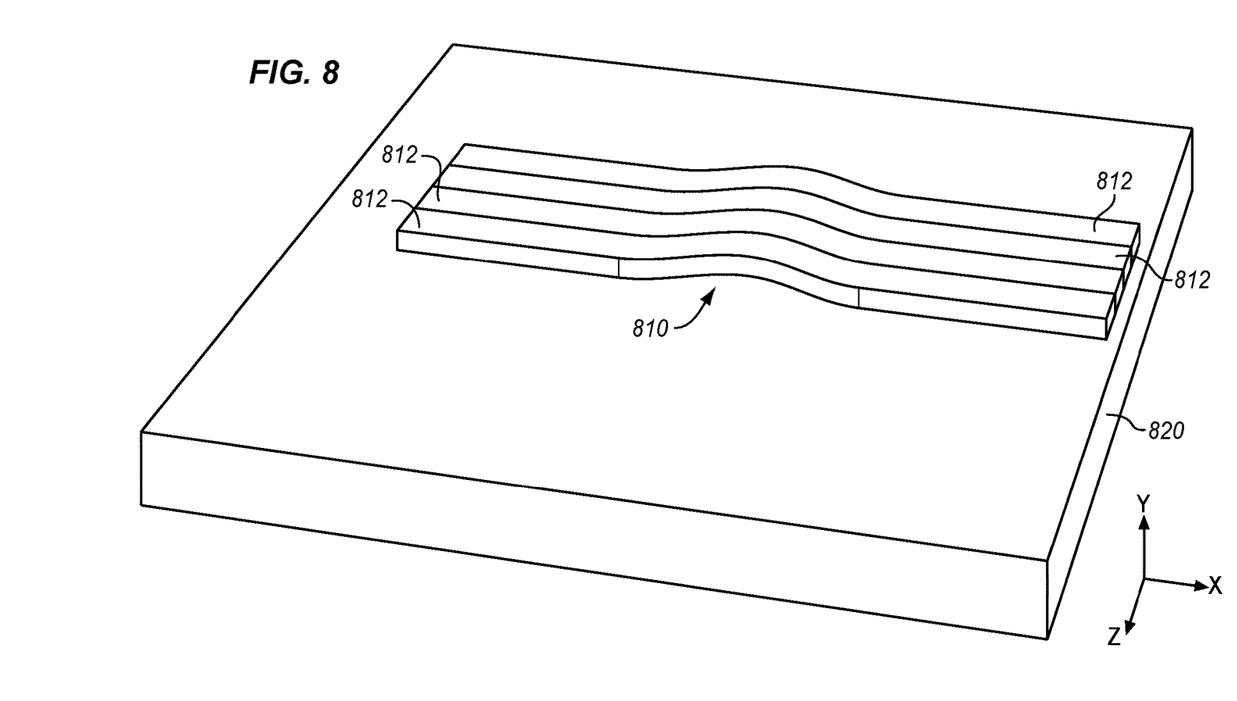
FIGS. 8-9 are diagrams illustrating a steered tow in a layup for a composite part in an exemplary embodiment.
Figure 9:
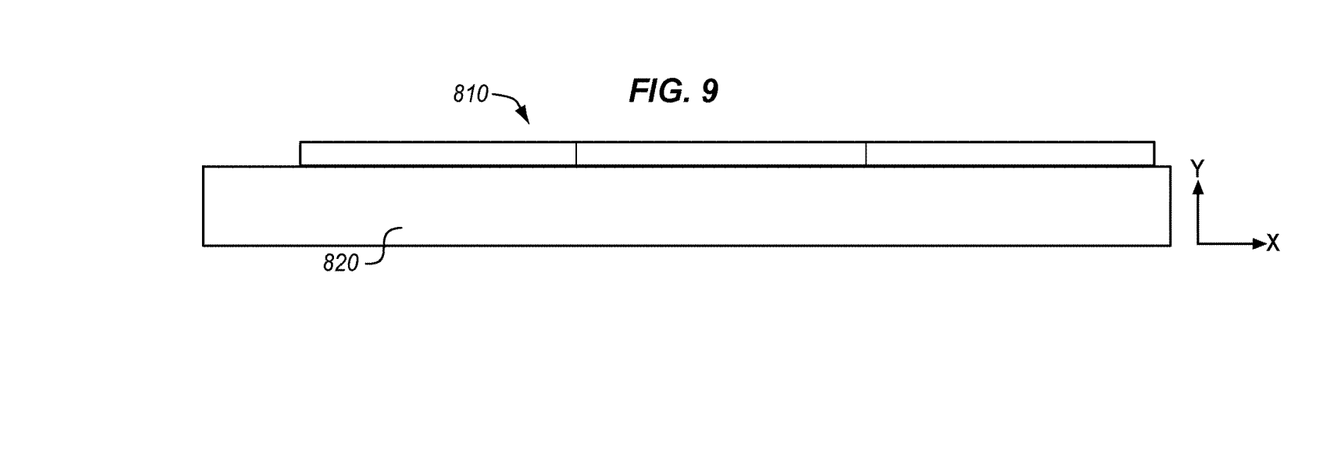

FIGS. 8-9 are diagrams illustrating a layup feature comprising steered tows in a layup for a composite part in an exemplary embodiment. A steered tow may be laid up onto a completely flat mandrel 730 to form a planar shape, and may provide additional material in order to enable a 2.5D laminate 810 to comply with 3D curvature during forming. In this embodiment, tows 812 are steered such that they travel in-plane along the surface of mandrel 820, and hence all have the same height.

Figure 10:
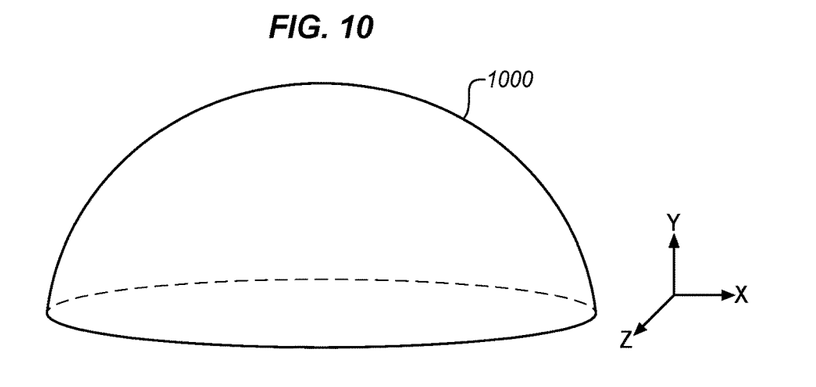
FIG. 10 is a diagram of a 3D composite part formed from a laminate in an exemplary embodiment.
Figure 11:
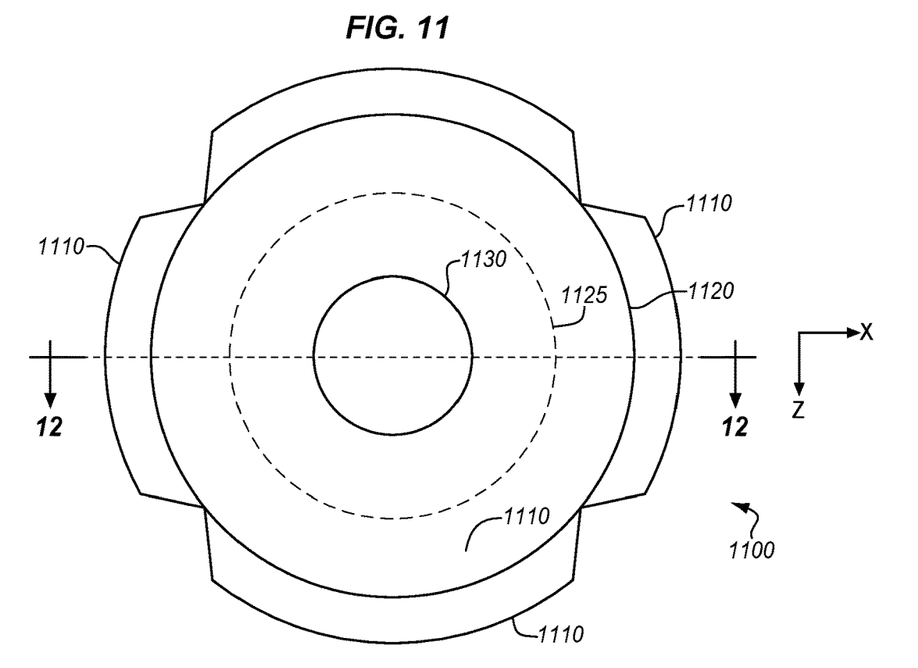
FIGS. 11-12 are views of the laminate used to form the composite part of FIG. 10 in an exemplary embodiment.
Figure 12:
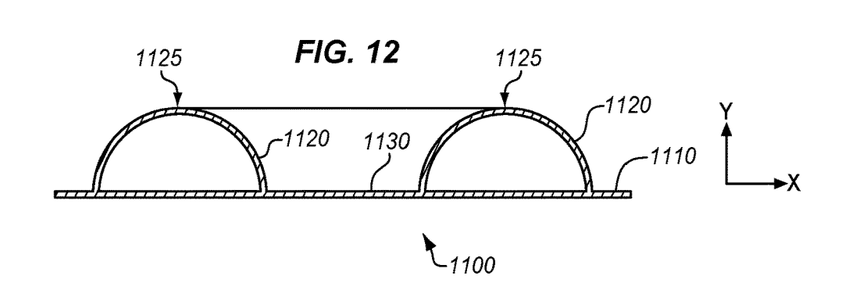

FIG. 10 is a diagram of a 3D composite part 1000 formed from a laminate in an exemplary embodiment. FIGS. 11-12 are views of the laminate 1100 used to form the composite part 1000 of FIG. 10 in an exemplary embodiment. Specifically, FIG. 11 is a top view, and FIG. 12 is a cut-through view corresponding to view arrows 12 of FIG. 11. In this embodiment, laminate 1100 includes an annular protrusion/ridge 1120, including peak 1125. Annular protrusion 1120 comprises material which ensures that laminate 1100 may be formed to match the 3D shape of composite part 1000. Laminate 1100 further includes central portion 1130, and excess regions (e.g., scrap 1110). During forming of laminate 1100 into part 1000, central portion 1130 is drawn taught, but tearing is prevented by excess material found in annular protrusion 1120. By balancing the amount of material placed into these different regions, part 1000 may be formed without the formation of wrinkles or tears.

Figure 13:
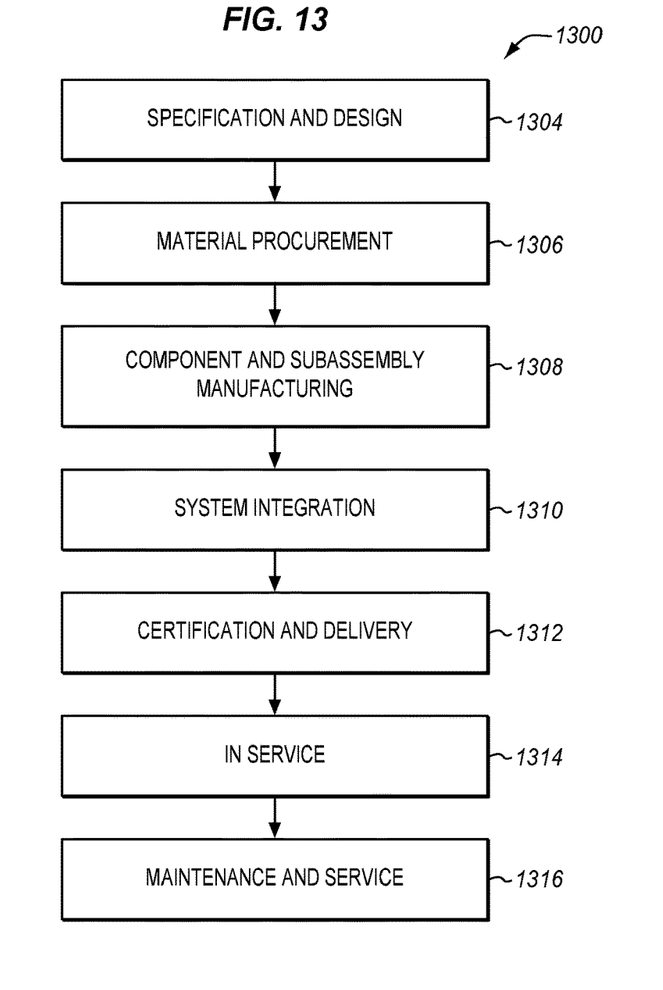
FIG. 13 is a flow diagram of aircraft production and service methodology in an exemplary embodiment.
Figure 14:
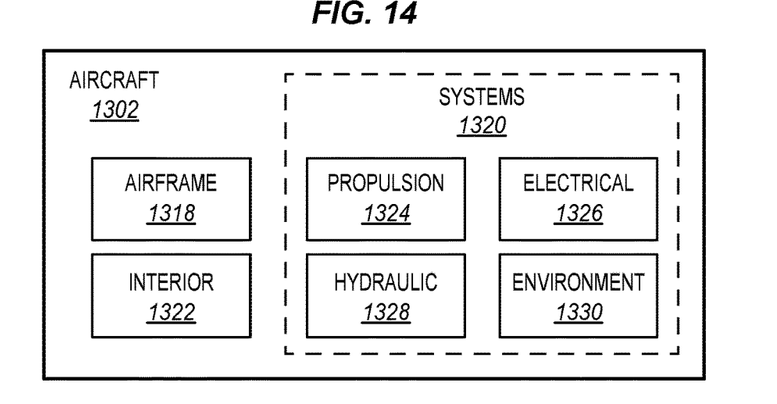
FIG. 14 is a block diagram of an aircraft in an exemplary embodiment.

Referring more particularly to the drawings, embodiments of the disclosure may be described in the context of an aircraft manufacturing and service method 1300 as shown in FIG. 13 and an aircraft 1302 as shown in FIG. 14. During pre-production, exemplary method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine maintenance and service 1316 (which may also include modification, reconfiguration, refurbishment, and so on). Apparatus and methods embodied herein may be employed during any one or more suitable stages of the production and service method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion 1324, electrical 1326, hydraulic 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by exemplary method 1300 may include an airframe 1318 with a plurality of systems 1320 and an interior 1322. Examples of high-level systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1300. For example, components or subassemblies corresponding to production stage 1308 may be fabricated or manufactured in a manner similar to components or subassemblies produced while the aircraft 1302 is in service. Also, one or more apparatus embodiments, method embodiments, or a combination thereof may be utilized during the production stages 1308 and 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation, to maintenance and service 1316. For example, the techniques and systems described herein may be used for steps 1306, 1308, 1310, 1314, and/or 1316, and/or may be used for airframe 1318 and/or interior 1322. These techniques and systems may even be utilized for systems 1320, including for example propulsion 1324, electrical 1326, hydraulic 1328, and/or environmental 1330.

In one embodiment, laminate 240 is cured into a composite part that comprises a portion of airframe 1318, and is manufactured during component and subassembly manufacturing 1308. The composite may then be assembled into an aircraft in system integration 1310, and then be utilized in service 1314 until wear renders the part unusable. Then, in maintenance and service 1316, the composite may be discarded and replaced with a newly manufactured part. The enhanced layup design techniques described herein may be utilized throughout component and subassembly manufacturing 1308 in order to manufacture additional composite parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
   loading data defining a three dimensional (3D) shape for a composite part;
   identifying constraints based on dimensions of the 3D shape;
   simulating flattening of the 3D shape into a planar shape;
   acquiring a support structure having the planar shape;
   placing features in the form of grooves and ridges at the support structure which permit a laminate laid-up onto the support structure to compensate for the constraints during forming of the laminate into the 3D shape; and
   generating a Numerical Control (NC) program that directs an Automated Fiber Placement (AFP) machine laying up the laminate, the NC program including instructions for laying up tows of constituent material onto the support structure having the features, to form layers of the laminate.

2. The method of claim 1 further comprising:
   laying up the laminate onto the support structure according to the NC program.

3. The method of claim 2 further comprising:
   shaping the laminate after layup has completed.

4. The method of claim 3 wherein:
   shaping the laminate comprises:
      placing the laminate between complementary forming tools; and
      driving the forming tools towards each other to shape the laminate.

5. The method of claim 2 further comprising:
   acquiring images of tows placed by the AFP machine during layup;
   determining actual locations of tows placed by the AFP machine during layup based on the images;
   comparing the actual locations of tows with expected locations of tows indicated by the NC program;
   detecting discrepancies between the actual locations and the expected locations; and
   altering the NC program during layup based on the discrepancies.

6. The method of claim 5 wherein:
   a discrepancy comprises a gap between tows; and
   altering the NC program comprises adding instructions to place tows over the gap.

7. The method of claim 5 wherein:
   a discrepancy comprises a tow having an actual location that is an offset from an expected location; and
   altering the NC program comprises revising instructions for placing tows in other layers based on the offset.

8. The method of claim 5 wherein:
   determining actual locations of tows comprises placing tows in the images in a coordinate space of the NC program, based on a position and an orientation of a camera.

9. The method of claim 2 further comprising:
   curing the laminate into the composite part.

10. The method of claim 1 further comprising:
    iteratively:
       simulating placement of the features at the support structure;
       generating a simulation forming a laminate laid-up onto the support structure into the 3D shape; and
       altering the features based on expected wrinkles or tears indicated by the simulation.

11. A non-transitory computer readable medium embodying programmed instructions which, when executed by a processor, are operable for performing a method comprising:
    placing features at a planar mandrel which permit a laminate laid-up onto the mandrel to compensate for constraints corresponding with a three dimensional (3D) shape during forming of the laminate into the 3D shape; and generating a Numerical Control (NC) program that directs an Automated Fiber Placement (AFP) machine laying up the laminate, the NC program including instructions for laying up tows of constituent material onto the planar mandrel, including the features placed at the mandrel, to form layers of the laminate;

laying up the laminate according to the NC program; and forming the laminate into the 3D shape.

12. The medium of claim 11 wherein the method further comprises:

loading data defining the 3D shape;

identifying the constraints based on dimensions of the 3D shape;

flattening the 3D shape into a planar shape; and fabricating the mandrel according to the planar shape.

13. The medium of claim 11 wherein:

adding the features comprises adding alterations to a surface of the mandrel.

14. The medium of claim 11 wherein the method further comprises:

placing the laminate between complementary forming tools; and driving the forming tools towards each other during shaping.

15. A system comprising:

a memory that stores data defining a three dimensional (3D) shape for a composite part; and a controller that loads the data, identifies constraints based on dimensions of the 3D shape, flattens the 3D shape into a planar shape, and places features at the planar shape which permit a laid-up laminate to compensate for the constraints during forming of the laminate into the 3D shape, the controller generates a Numerical Control (NC) program that directs an Automated Fiber Placement (AFP) machine laying up the laminate, the NC program including instructions for laying up tows of constituent material to form layers of the laminate.

16. The system of claim 15 wherein:

the controller further directs curing of the laminate into the composite part.

17. The system of claim 15 wherein:

the features include alterations to a surface of a flat mandrel on which the laminate is laid up.

18. The system of claim 15 wherein:

the features include tows which are steered within a layer of the laminate to increase an amount of material at the laminate.

19. The system of claim 15 wherein:

the controller adds the features by predicting an amount of distance that a portion of the planar shape will expand during forming, and adding tow length to the planar shape corresponding with the amount.

20. The system of claim 15 further comprising:

a camera that acquires images of tows placed by the AFP machine during layup, wherein the controller engages in a feedback control loop comprising determining actual locations of tows placed by the AFP machine during layup based on the images, comparing the actual locations of tows with expected locations of tows indicated by the NC program, detecting discrepancies between the actual locations and the expected locations, and altering the NC program during layup based on the discrepancies.

21. The system of claim 20 wherein:

a discrepancy comprises a gap between tows; and the controller alters the NC program to cover the gap by adding instructions to place tows over the gap.

22. The system of claim 20 wherein:

a discrepancy comprises a tow having an actual location that is an offset from an expected location; and the controller alters the NC program by revising instructions for placing tows in other layers based on the offset.

23. The system of claim 20 wherein:

the controller determines actual locations of tows by placing tows depicted in the images in a coordinate space of the NC program, based on a position and an orientation of the camera.

24. A method comprising:

forming a composite part by:

laying up a two dimensional (2D) laminate onto a mandrel that has features which cause plies to be laid down such that expected shearing between the plies is already built into the 2D laminate; and forming the 2D laminate into a complex contour preform, including performing the expected shearing between the plies.

25. The method of claim 24 wherein:

the features comprise tows which are steered within a layer of the laminate to increase an amount of material at the laminate.

26. The method of claim 24 wherein:

the features comprise added tow lengths.

27. The method of claim 24 wherein:

forming the laminate comprises stamping the laminate between complementary forming tools.

28. The method of claim 24 wherein:

the 2D laminate is flat, and the features comprises vertical perturbations in the 2D laminate.

* * * * *